UNITED STATES PATENT OFFICE.

LEVI DODGE, OF WATERFORD, NEW YORK.

IMPROVEMENT IN FIRE-KINDLINGS.

Specification forming part of Letters Patent No. 118,700, dated September 5, 1871.

*To all whom it may concern:*

Be it known that I, LEVI DODGE, of Waterford, in the county of Saratoga and State of New York, have invented certain new and useful Improvements in Fire-Kindlers, of which the following is a specification:

My invention consists of kindling for fires, composed of wood-shavings, either alone or in combination with other combustible material, compressed into the form of a bale or block of suitable shape, and bound with wire or cord or other suitable binding devices.

The shavings compose the body of the kindler. It has been heretofore impracticable to put them in the market as a kindler or as fuel owing to the great space occupied by them as compared with their actual bulk or weight. But I find that by compressing them in a press, such as a baling-press, compact blocks or bales may be formed, which, while of small size and adapted to be sold at any wood-yard, or grocers, or provision dealers, or other place where kindling-wood is for sale, will contain a great amount of kindling. Small blocks of wood may be introduced in the body of the bale, or kerosene, resin, or any other combustible matter may be added to the same, if desired.

A baling-press well adapted for compressing the shavings is described in an application for a patent of even date herewith now pending in my name in the United States Patent Office.

In baling the shavings they are introduced into the press and then compressed into a bundle or bale of suitable size and shape, this depending, of course, upon the dimensions of the press. After being compressed the bale or bundle is bound, and in that state is ready for the market. When required for use the wire or cord or other binding device is cut or loosed, and as great a quantity of the shavings as necessary can be taken from the bale. The shavings may be compressed into a very compact and solid mass, so that one bundle of kindling will last a long time.

What I claim, and desire to secure by Letters Patent, is—

As a new article of manufacture, fire-kindling, composed of shavings, either alone or in combination with other combustible material, compressed into a compact or solid bale or bundle and bound, substantially as herein specified.

In testimony whereof I have signed my name to this specification before two subscribing witnesses.

LEVI DODGE.

Witnesses:
A. POLLOK,
W. BAILEY.